United States Patent
Herrero

(10) Patent No.: US 7,143,409 B2
(45) Date of Patent: Nov. 28, 2006

(54) AUTOMATED ENTITLEMENT VERIFICATION FOR DELIVERY OF LICENSED SOFTWARE

(75) Inventor: Victor R. Herrero, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 09/896,657

(22) Filed: Jun. 29, 2001

(65) Prior Publication Data

US 2003/0005427 A1    Jan. 2, 2003

(51) Int. Cl.
  G06F 9/445 (2006.01)
  H04L 9/32 (2006.01)
(52) U.S. Cl. .................... 717/178; 705/51
(58) Field of Classification Search ........ 717/171–173, 717/176–178; 709/220; 710/5; 705/51, 705/57, 59; 726/2.21
See application file for complete search history.

(56) References Cited

U.S. PATENT DOCUMENTS

| | | | |
|---|---|---|---|
| 4,924,378 A | 5/1990 | Hershey et al. | |
| 4,937,863 A | 6/1990 | Robert et al. | |
| 5,138,712 A | 8/1992 | Corbin | |
| 5,204,897 A | 4/1993 | Wyman | |
| 5,260,999 A | 11/1993 | Wyman | |
| 5,438,508 A | 8/1995 | Wyman | |
| 5,553,143 A | 9/1996 | Ross et al. | |
| 5,715,314 A * | 2/1998 | Payne et al. ................ | 705/78 |
| 5,745,879 A | 4/1998 | Wyman | |
| 5,754,763 A | 5/1998 | Bereiter | |
| 5,758,069 A | 5/1998 | Olsen | |
| 5,790,664 A | 8/1998 | Coley et al. | |
| 5,845,077 A * | 12/1998 | Fawcett ...................... | 709/221 |
| 5,903,650 A | 5/1999 | Ross et al. | |
| 5,905,860 A | 5/1999 | Olsen et al. | |
| 6,029,145 A | 2/2000 | Barritz et al. | |
| 6,067,582 A * | 5/2000 | Smith et al. .................. | 710/5 |
| 6,105,069 A | 8/2000 | Franklin et al. | |
| 6,189,146 B1 * | 2/2001 | Misra et al. ................ | 717/177 |
| 6,195,432 B1 * | 2/2001 | Takahashi et al. .......... | 380/277 |
| 6,367,073 B1 * | 4/2002 | Elledge ...................... | 717/178 |
| 6,385,596 B1 * | 5/2002 | Wiser et al. ................. | 705/51 |
| 6,493,871 B1 * | 12/2002 | McGuire et al. ............ | 717/173 |
| 6,513,159 B1 * | 1/2003 | Dodson ....................... | 717/178 |
| 6,604,238 B1 * | 8/2003 | Lim et al. ................... | 717/177 |
| 6,697,852 B1 * | 2/2004 | Ryu ........................... | 709/220 |
| 6,718,549 B1 * | 4/2004 | Narin et al. ................ | 717/178 |
| 6,891,953 B1 * | 5/2005 | DeMello et al. ............ | 380/277 |

(Continued)

OTHER PUBLICATIONS

T. Bartoletti, L.A. Dobbs, M. Kelley, "Secure Software Distribution System", Feb. 1997.*

Primary Examiner—Kakali Chaki
Assistant Examiner—Trenton J. Roche
(74) Attorney, Agent, or Firm—John E. Campbell; Jon A. Gibbons; Fleit, Kain, Gibbons, Gutman, Bongini & Bianco P.L.

(57) ABSTRACT

A method, and computer readable medium for the central management, delivery and installation of media less software. The ordered software is packaged in such a way that only standard options are offered. The standard installation results in consistent software images across a corporation client PCs and eliminates the need of help desk involvement during installation. The software company is not involved with the burden of software distribution and tracking. Sales and the sales reports are generated and supplied in real time back to the software company.

16 Claims, 10 Drawing Sheets

U.S. PATENT DOCUMENTS

2001/0011238 A1* 8/2001 Eberhard et al. ............. 705/27
2002/0078203 A1* 6/2002 Greschler et al. ........... 709/225
2002/0128975 A1* 9/2002 Klemba et al. ............... 705/57
2002/0157089 A1* 10/2002 Patel et al. ................. 717/178
2002/0174422 A1* 11/2002 Kelley et al. ............... 717/178
2004/0015961 A1* 1/2004 Chefalas et al. ............ 717/178

* cited by examiner

AUTOMATED ENTITLEMENT VERIFICATION FOR DELIVERY OF LICENSED SOFTWARE

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

Not Applicable

BACKGROUND OF THE INVENTION

1. Field of The Invention

This invention generally relates to the field of software purchasing, distribution and help desk workflow, and more particularly to licensed software selected, delivered and installed through a network.

2. Description of The Related Art

The deployment of software is the last step in the cycle of software commerce. It suffers from all of the classical product and product distribution problems. For most products the problems encountered include, manufacturing, documentation, shipping, storage, over production, inventory shortages, and theft. However, software has some unique problems. One such problem is distribution. It's not uncommon for major software to be released more than once a year and distribution must be managed for frequent turnover where the product life is limited. In addition the distributors often are selling several competitive products. They are searching for a reason to sell one product over another product.

Once purchased the installation of the software product is often performed by consumers with limited computer skills. Many times this results in consumer confusion and frequent calls to help centers. The customer often times blames the software vendor for problems, which may be due to the particular PC being used, its configuration or the state of the co-resident software including the operating system. In a company the problems may be even worse as typically a IS (Information Services) person or department is accountable for not only all of the computers, which include hardware and software, but also the maintenance and upgrading. The employees always want the latest software and in many cases "require" special and unique configurations. Additionally the IS department tries to use just in time purchasing methods. Accordingly, a need exists for a efficient software deployment and installation solution to overcome the problems mentioned above.

Continuing further, there are two major developments that are influencing the software selection and deployment industry. One is the concept of very thin client, which usually means among other things, no removable media. With this type of a PC the software is installed and maintained and upgraded through a network. The second concept is the idea of "software is a service". Notable here is Microsoft's .NET strategy, and SUN Microsystems's .COM efforts. With these business models the concept is that software is not bought in the classical sense but rather it is rented, or even given away. Accordingly, a need exists for a distribution method for software products, to provide distribution for normal computers, for thin clients, normal software products and also support for software that is a service.

Medium to large corporations use a centrally managed, enterprise-wide, software delivery application to distribute software to employees in an automated manner using installation packages. The software is packaged in such a way that only certain approved options are offered. This allows for the installation to take place with minimal up-front prompting of the user. The installation package is automated, and the installation performs identically for all employees. The installation package during installation will typically check for sufficient system resources on the employee's PC to stage, and perform the installation. Other checks are also performed including compatibility with the operating system, and other requisite software.

Although these centrally managed software delivery applications are useful they are not without their shortcomings. One shortcoming is the requirement to enter product keys during installation. Often times the management and security of these keys are problematic. Accordingly, a need exists for a method and a system to overcome this problem.

Another shortcoming is the requirement for users to respond to installation prompts such as which installed options to select. Installation options such as destination directories and options are required. For many inexperienced computer users, the answers to these installation questions are often not known. Moreover, different answers to installation questions among employees causes the installation package to install the software differently from system to system. Different installations across systems are much harder for support personnel to supply help and guidance. Accordingly, a need exists for a method and a system to overcome this problem.

Still, another shortcoming with the centrally managed, enterprise-wide, software delivery applications of the prior art is often times there is a need for internal or external logic associated with a software package to provide entitlement checks. The use of software entitlement checks with specialized programming and logic is expensive to deploy and expensive to maintain. The administrative costs associated with entitlement are particularly expensive. Accordingly, a need exists to overcome this problem as well.

Yet, still another shortcoming with the centrally managed, enterprise-wide, software delivery applications is the amount of communications between licensed software applications and licensed management servers being installed and the server from which the software is downloaded. Many times even after software is downloaded in the prior art systems, license information must be passed back from the application to the server. Accordingly, a need exists to overcome this shortcoming as well.

SUMMARY OF THE INVENTION

Briefly, according to the present invention, disclosed is a method, a system and computer readable medium for the selection, configuration, entitlement, delivery, installation and maintenance of software over a network. The software is download with associated scripting controls that will assure that all of the correct installation decisions and entitlement keys are entered. The software may be part of a major total upgrade bundle which includes several software product installations, or it may be a simple bug fix upgrade to existing software. This solution may be offered through a network for third party software vendors, or be part of a company wide software enterprise.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
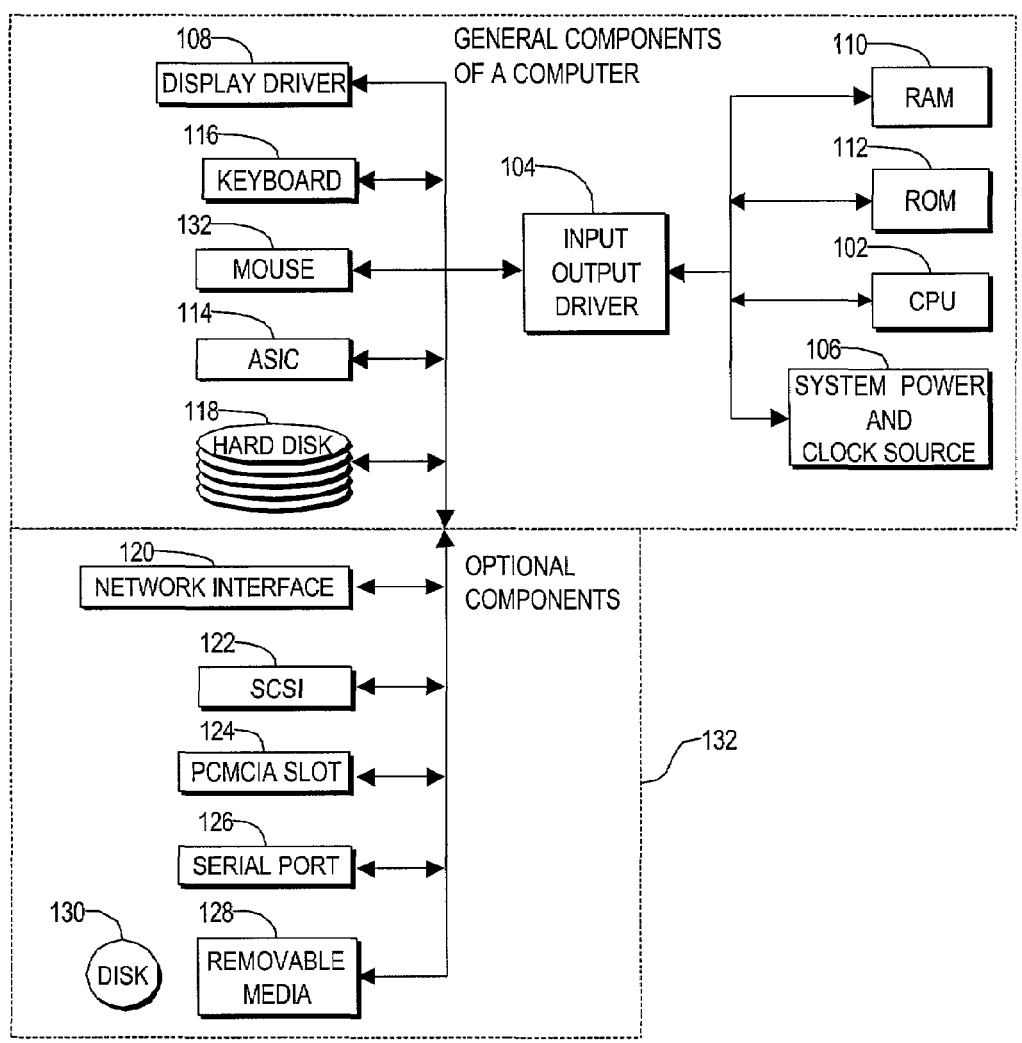
FIG. 1 is a block diagram of an exemplary computer system that includes optional components, upon which the present invention can be implemented.

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

In the drawing like numerals refer to like parts through several views.

Exemplary Server System

Referring to FIG. 1, there is shown a block diagram 100 of the major electronic components of an information processing system 100 for the one or more servers in accordance with the invention. The electronic components include: a central processing unit (CPU) 102, an Input/Output (I/O) Controller 104, a mouse 132 a keyboard 116, a system power and clock source 106; display driver 108; RAM 110, ROM 112, ASIC (application specific integrated circuit) 114 and a hard disk drive 118. These are representative components of a computer. The general operation of a computer comprising these elements is well understood. Network interface 120 provides connection to a computer network such as Ethernet over TCP/IP or other popular protocol network interfaces. Optional components for interfacing to external peripherals include: a Small Computer Systems Interface (SCSI) port 122 for attaching peripherals; a PCMCIA slot 124; and serial port 126. An optional diskette drive 128 is shown for loading or saving code to removable diskettes 130. The system 100 may be implemented by combination of hardware and software. Moreover, the functionality required for using the invention may be embodied in computer-readable media (such as 3.5 inch diskette 130) to be used in programming an information-processing apparatus (e.g., a personal computer) to perform in accordance with the invention.

Example Software Hierarchy

Figure 2:
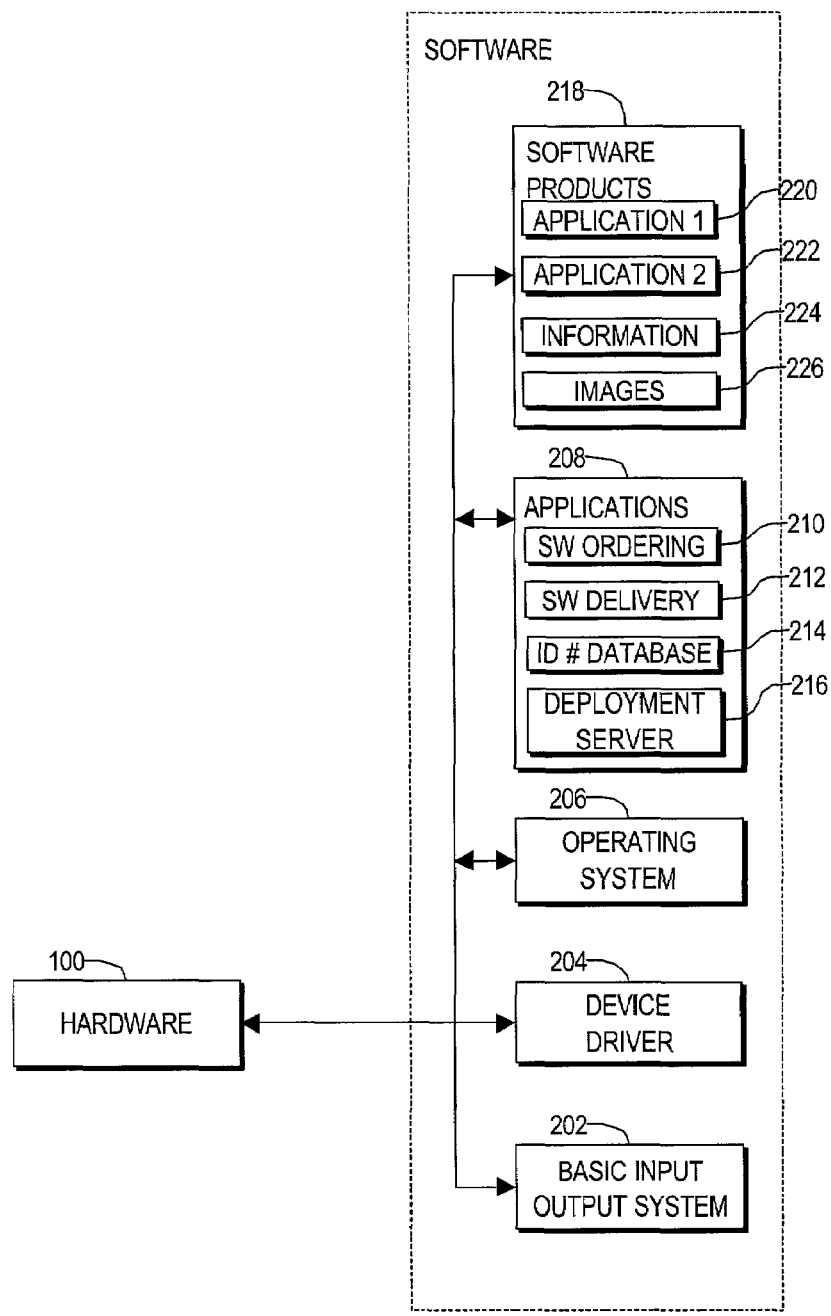
FIG. 2 is a block diagram of an exemplary software hierarchy that is executed on the hardware of FIG. 1.

FIG. 2 is a block diagram 200, illustrating the software hierarchy for the information processing system 100 of FIG. 1 according to the present invention. The BIOS (Basic Input Output System) 202 is a set of low level of computer hardware instructions for communications between an operating system 206, device driver 204 and hardware 200. Device drivers 204 are hardware specific code used to communicate between and operating system 206 and hardware peripherals such as a CD ROM drive or printer. Operating system 206 is the master program that loads after BIOS 202 initializes, that controls and runs the hardware 100. Examples of operating systems include Windows 3.1/95/98/ME/2000/NT, Unix, Macintosh, OS/2, Sun Solaris and equivalents. Applications 208 are software application programs written in C/C++, assembler or other programming languages.

Applications 208 typically have several programs that are available for usage. Examples are software ordering system 210, a software delivery application 212, an entitlement ID database 214 and a deployment server application to transfer and install the ordered software 216. It is noted that there may be other programs in applications 208 such as word-processing files, spreadsheet files and network browsers (not shown).

Taken together these are the preferred embodiments of the present invention. There are also other software files such as information 218. The information files can be such as, application 1 such as a word processing program 220, application 2 such as a spread sheet program 222, and text information such as a application manual 224, or graphical information such as jpeg files 226.

Discussion Of Hardware And Software Implementation Options

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Software Entitlement

Figure 3:
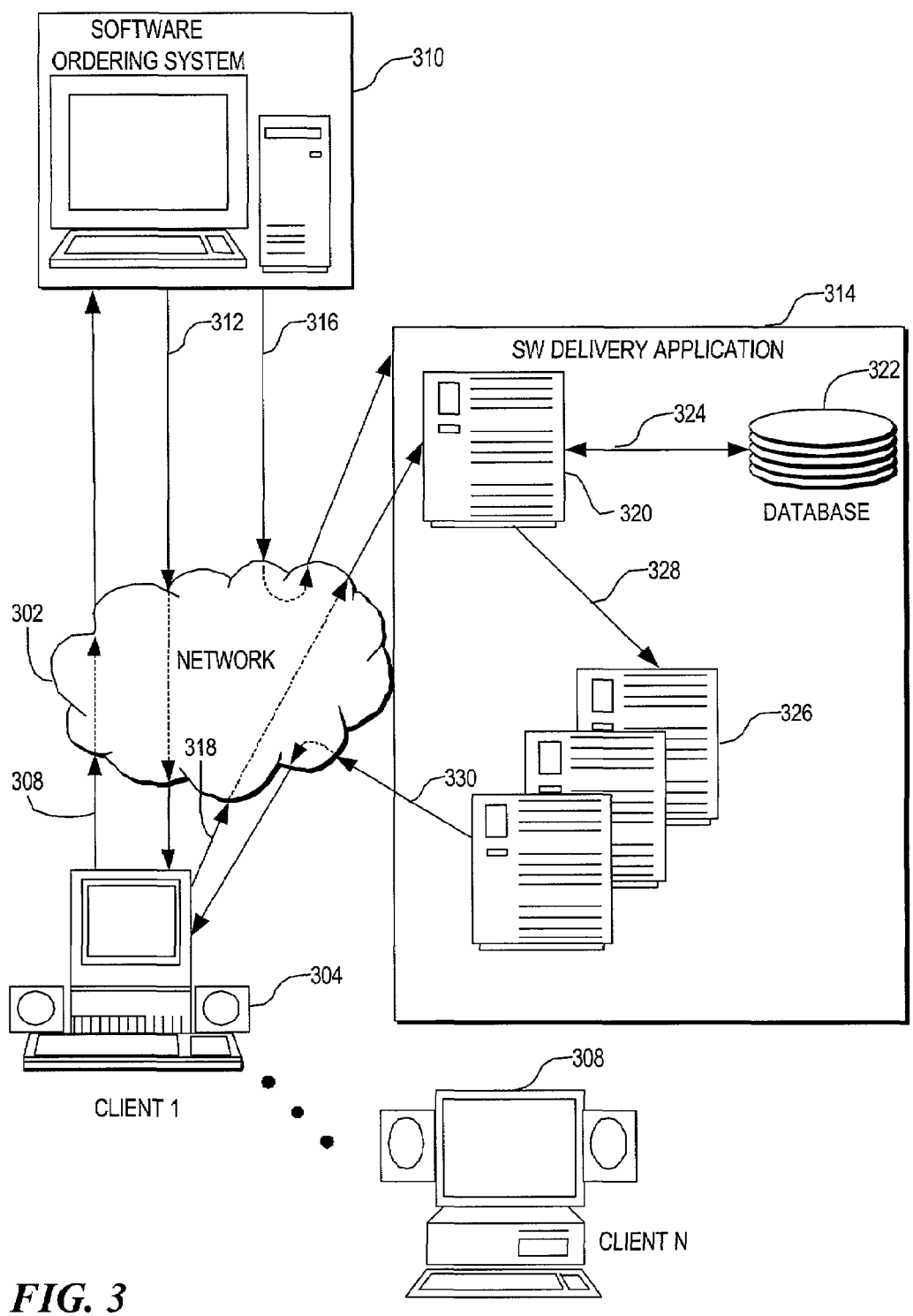
FIG. 3 is a functional blockdiagram of a network connected client and server topology according to the present invention.

FIG. 3 illustrates a functional flow block diagram 300, of a network 302 with attached clients and servers. Client 1 304 through client N 308 are connected to a network 302 such as the Internet. The ordering process over a network is described below.

This process begins with an employee or customer using Client 1 304 orders 308 a copy of a particular software package. The order is received at the software ordering system 310. This ordering system contains a list of available software from the employee's company and/or any third party software. Once the order is placed the ID is sent 312 back to Client 1 304. This same entitlement ID # is also sent 316 to the software delivery application 314. The entitlement ID # is stored in the software delivery application's entitlement ID database 322. Once Client 1 304 is ready to receive the ordered software, a request is made 318, to the software delivery application 314. This request may be made as soon as the entitlement ID # is received by the Client 1 304, or at a time later. This request is received by the software delivery application server 320, which is part of the software delivery application 314. The software delivery application 320 compares 324 the received entitlement ID # to the one that is stored in the entitlement ID database 322. Assuming that the ID #s match the delivery server 320 schedules 328 the ordered software on the staging servers 326. If the ID #s do not match, an error message is sent back to the Client 1 (not shown). Finally the correct staging server 326 connects with the client 1 304 and the ordered software payload is downloaded and installed 330.

Software Payload Description

Figure 4:
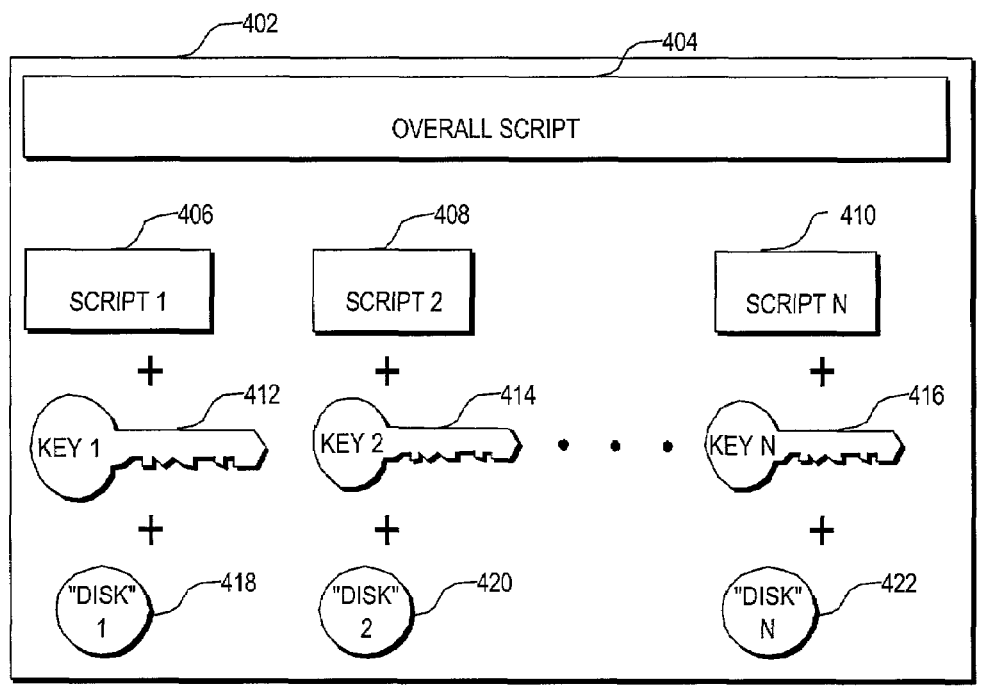
FIG. 4 is a block diagram of the payload that is delivered to the client as illustrated in FIG. 3 according to the present invention.

Turning now to FIG. 4, illustrated is a block diagram 400 of the requested software that is delivered, as a payload 402 using a network 302, to the client 1 304 by the staging server 326. The overall script 404 contains all of the information required to download and install the requested software. The software may consist of only one file or as shown software files 1 418 through N 422. It is noted that the software may be any type of file. It may be data as in text files, spreadsheets, databases, presentations, or multimedia files. The software may be also be executable files such as word processors, spreadsheet programs, database programs or presentation software. Moreover, the software may be a collection of software bundled together as a standard business software "seat" or a workstation "bench" in the case of science and engineering software.

The over all script 404 in this example of the present invention is controlling individual installation scripts 1 406 through script N 410. These scripts 1 through N install the requested software 418 through 422 into Client 1 304 if and only if the software keys 1 through N412 through 416 are verified. In some cases a key may not be required for download and installation. These software keys contain software security codes, which the scripting controls 406 through 410 will control during the installation. The ordered software is downloaded as pre-selected images or "disks" 418 through 422 that are known to be compatible with the client's hardware and software, and that were verified during the installation process. The client's owner or operator need not be involved with any phase of the down load or installation. No further selections or interactions are required. No questions are asked, such as: "Where should the file be stored?", "select options" or selections that involve any of the possibly confusing decisions or opportunities for mistakes. All of the registration fill-in information has already been performed. Once initiated, the payload as described here causes the software to be downloaded and installed without any operator intervention.

Further Discussion of Payload

It is important to note that neither the software product being installed "disk" 1 through N 418 through 422 nor the software scripting such as the overall script 404 or the individual scripts 1 through N 406–410 require any internal or external logic associated with them to provide the entitlement check. The entitlement is performed by the software delivery application independently of the software package without impact to the software package repository.

Administrative costs associated with entitlement at the software delivery application are greatly minimized. The administrator is only required to define a relationship between the software package, that is, an identifier within the software delivery application 314 for the package and the software product "disk" 1 through N 418–422. This enables any corresponding entitlement IDs received from the software delivery application 314 to be associated with the payload package 402 in an automated manner.

Finally understand that the startup and shutdown, behavior, and use of the software product "disk" 1 through N 418–422 once installed, is not affected in any way. No communication is required between the software product and a license management server at the time of execution. No client entitlement, or license management code or API is associated with the software product.

Entitlement Verification of Client's Software Selection

Figure 5:
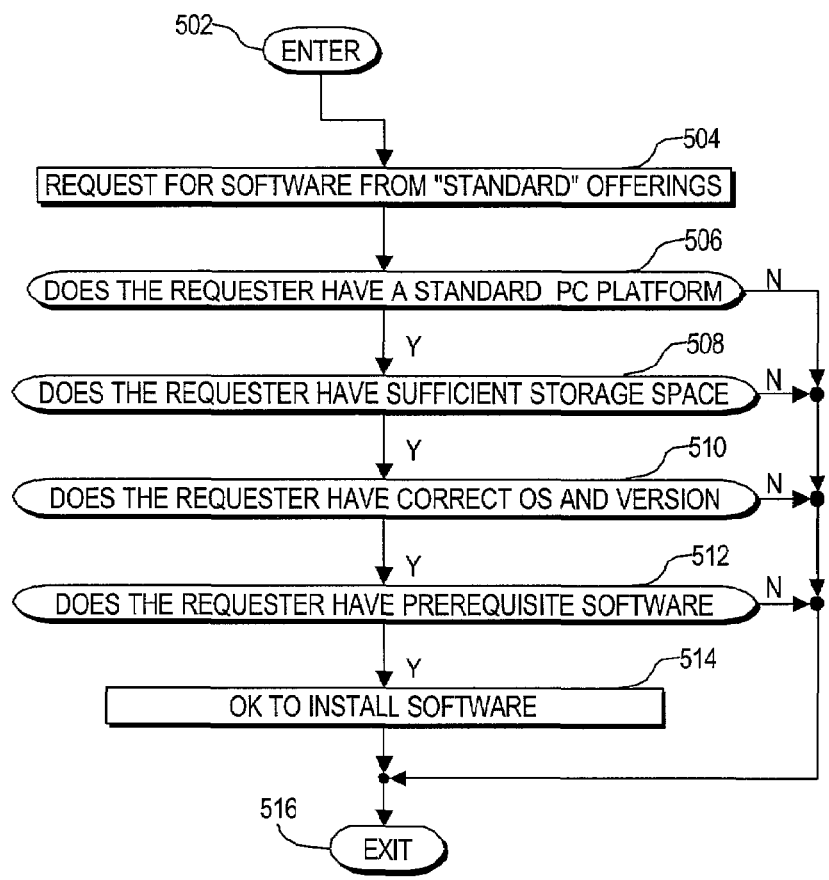
FIG. 5 is a flow diagram which shows the software delivery system performing the required checks, according to the present invention.

Turning now to FIG. 5, illustrated is a flow diagram 500, which illustrates the verification process. The flow is entered 502 when a client, such as 304, decides to order a copy of a software file. The client makes a request 504 for software from a "standard" set of offerings. The software vendor ordering system 310 checks 506 to see if the client is a standard PC platform. This standardization is required in a company to assure a level of similarity between client PCs of a given type. Given the standardization of the software, checks are performed to assure compatibility with the ordered software. A standard installation on the company's PCs reduces help desk maintenance. If the client PC platform is not within the predefined profile the flow is exited 516 and the software is not delivered. If the PC platform standard compliance is verified 506, the software vendor ordering system 310 checks if sufficient storage space is available 508. If the ordered software is too large for the client's PC a download will not be scheduled. If there is insufficient space the flow is exited 516. If there is space then the software is checked 510. The version of the operating system and any co-resident software that is required is checked. Here again the software that is being ordered will not work if the operating system is not of the right version and release, and similarly for the support software 512. If the software check is failed the flow is exited 516. If the check for co-resident software is passed then the ordering system 310 can install the requested software 514 and the flow is exited 516.

Software Entitlement Flow Diagram

Figure 6:
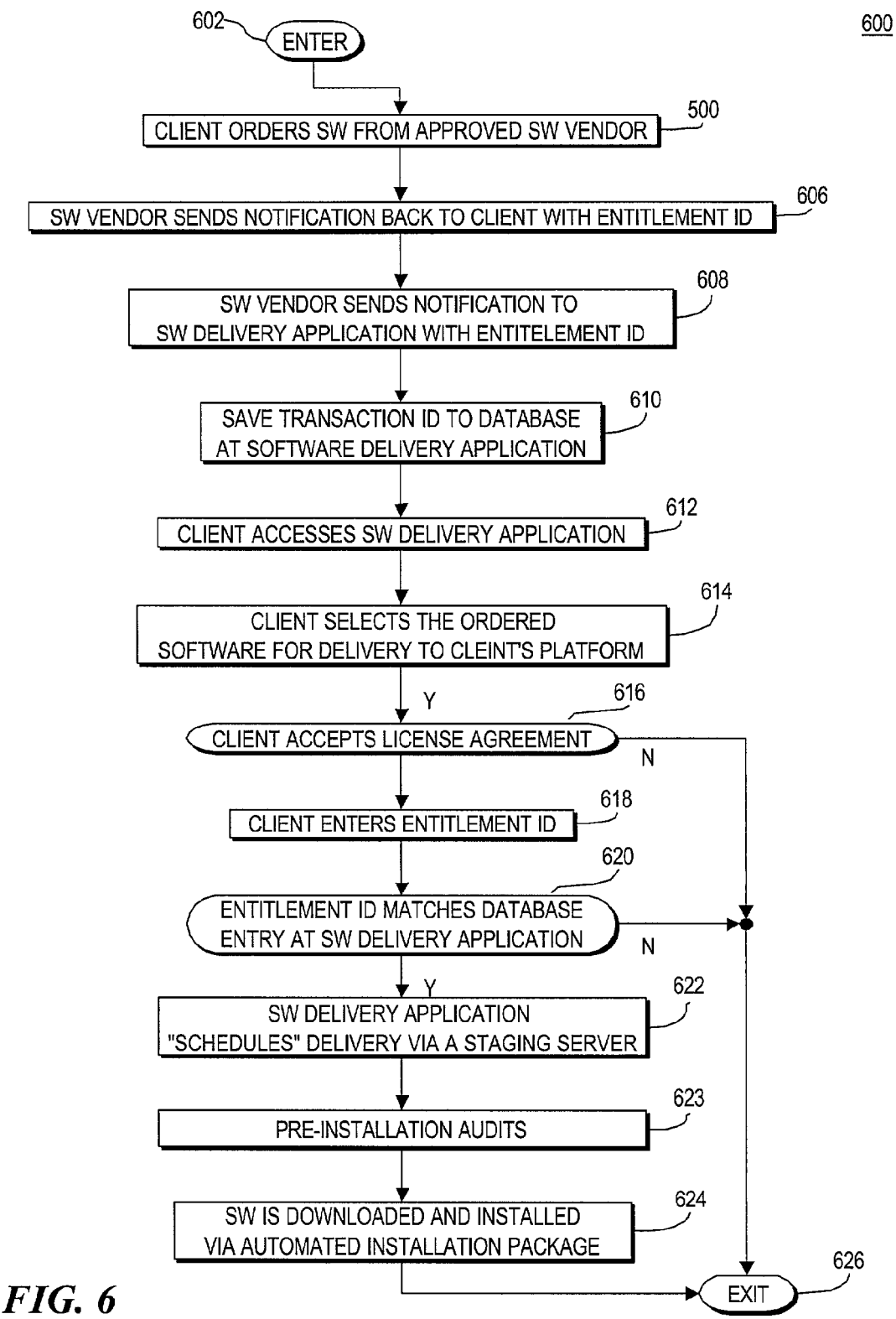
FIG. 6 is a flow diagram, which shows the over all ordering, delivery and installation of the requested software from a staging server, according to the present invention.

Turning now to FIG. 6, flow diagram 600 is shown which illustrates the ordering and the fulfillment of the present invention. The flow is entered 602 when a client orders software 500 from the software ordering system 310. It is further assumed that the entitlement ID has been sent to the client 606. In addition the software vendor ordering system 310 sends notification to the software delivery application 314 with the entitlement ID # 608. This entitlement ID # is saved into a database 322 at the software delivery application 610. At any time after receiving the entitlement ID # the client can access the software delivery application 612 and request the delivery of the ordered software 614. The client is presented with a license agreement 616. If the agreement is not accepted the flow is exited 626. If the agreement is accepted 616 then the client can enter the entitlement ID # 618 If the entered entitlement ID # does not match the stored entitlement ID # in the entitlement ID database 322 the flow is exited 626. If it does match 620 then the software delivery application schedules a delivery 622 via the staging servers 326. The software delivery application 314 next performs the pre-installation audits 623, which are explained below. Finally the software delivery application downloads and installs 624 the requested software and the flow is exited 626.

Screen Shot of Software Selection

Figure 7:
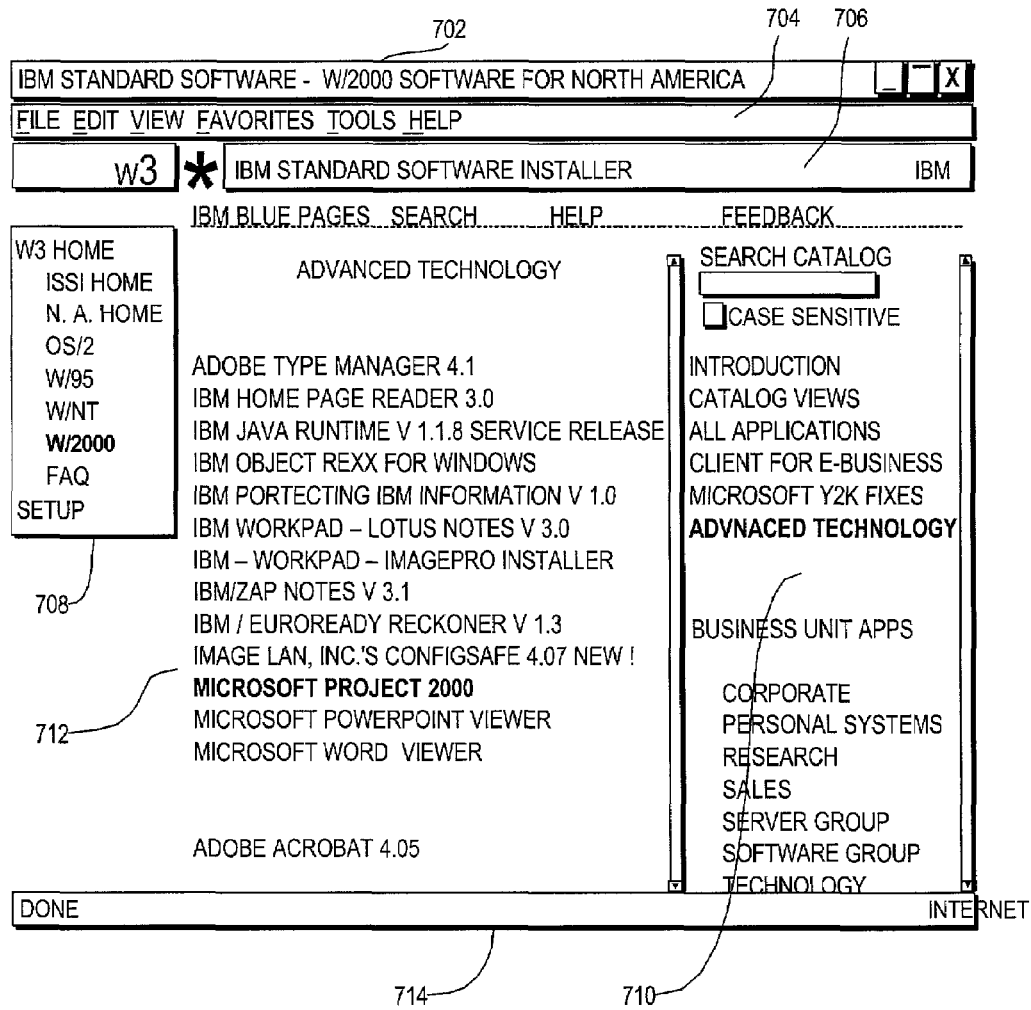
FIG. 7 is a screen shot of the selection of the desired software from a menu of software according to the present invention.

Turning now to FIG. 7, is a screen shot 700 of the present invention's software selection page. Using a Internet browser 702 the client is presented the page entitled IBM standard software—W/2000 for North America. Note that a geographic selection was made earlier. (not shown) This Internet page contains the normal Windows controls 704 such as file, edit, view, favorites, tools, and help. The client has selected a URL (Uniform Resource Locator) that presents the W3 IBM standard software installer selection menu 706. From this selection menu the client has selected the W/2000 page from the W3 home page 708. This is indicated, as "W/2000" is bold. Given this selection the client is presented with a search catalog and a list of topics, from which the client has selected the advanced technology applications 710. This is indicated, as "as-is applications" is bold. This menu selection in turn has presented the client with the main menu of as-is applications 712. From this main menu the client has selected the Microsoft Project 2000 software package for download and installation. Finally the lower task bar 714 indicates that the client is connected to the Internet and that the transfer is completed.

Screen Shot of Entitlement ID Entry Page

Figure 8:
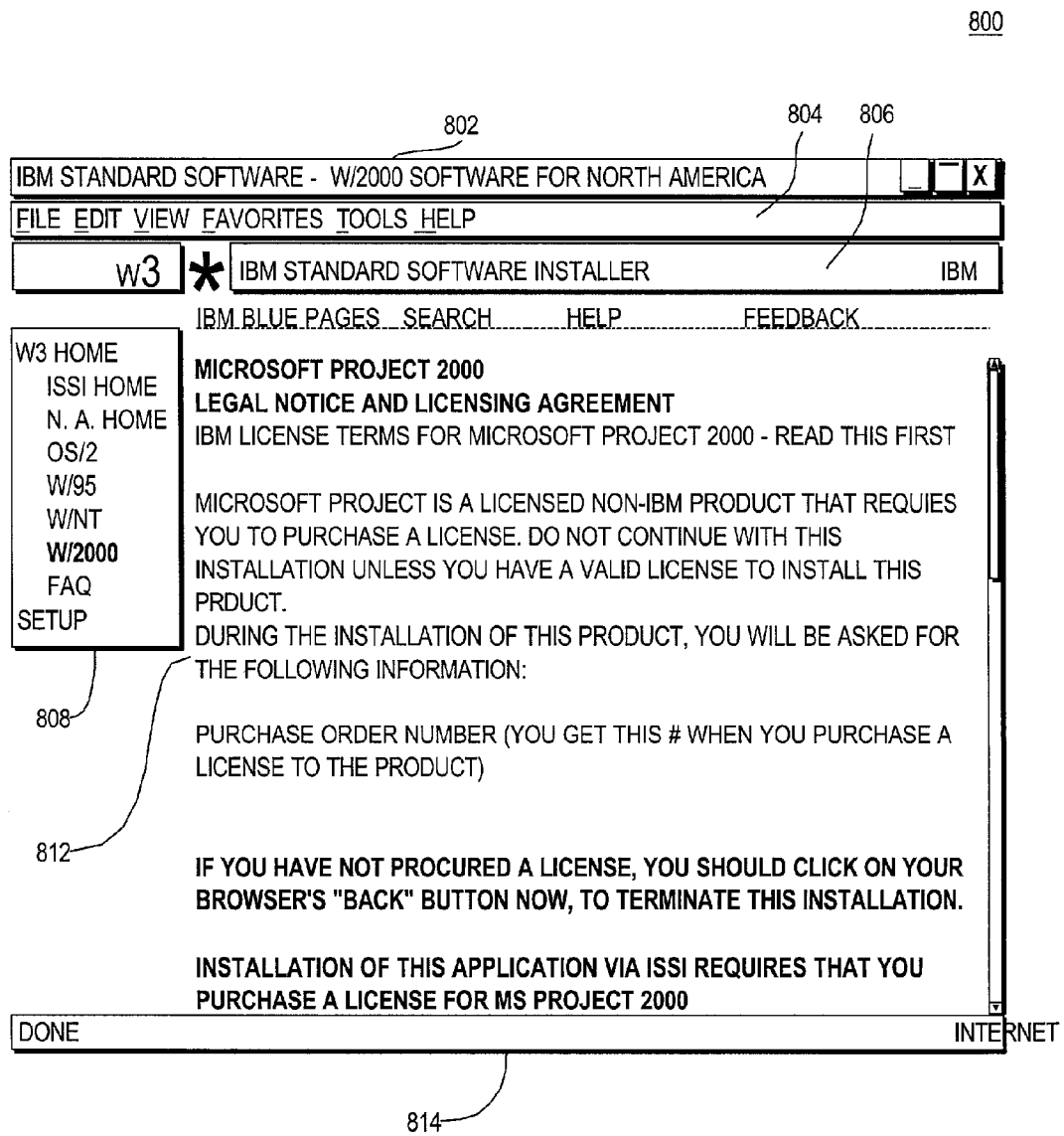
FIG. 8 is a screen shot of the license agreement, which is presented to the client, according to the present invention.

FIG. 8, is a screen shot 800 of the start of the licensing agreement, according to the present invention. Once the client has selected the desired software a dialog is presented to assure that the client agrees to the licensing and has local permission for the desired software. A typical browser window contains the Internet page 802 is shown, which is presented when the client selects a desired program Microsoft Project 2000 for download and installation 712. This Internet page contains the typical Windows controls 804 such as file, edit, view, favorites, tools, and help. The client has selected a URL (Uniform Resource Locator) that presents the W3 IBM standard software installer selection menu 706, and is continuing to select additional sub-menus. The client has selected the W/2000 page from the W3 home page 808. On the previous screen the client selected desired software. This software, the Microsoft Project 2000 is presented with a legal notice and licensing agreement 812. The client reads the agreement and accepts it 616, which requires scrolling down, (not shown) and at the end of this agreement certain information will be requested. The information is the entitlement ID #. Finally the lower task bar 814 indicates that the client is connected to the Internet and that the transfer of the present page is completed.

Screen Shot of Licensing Agreement Purchase and Order Numbers

Figure 9:
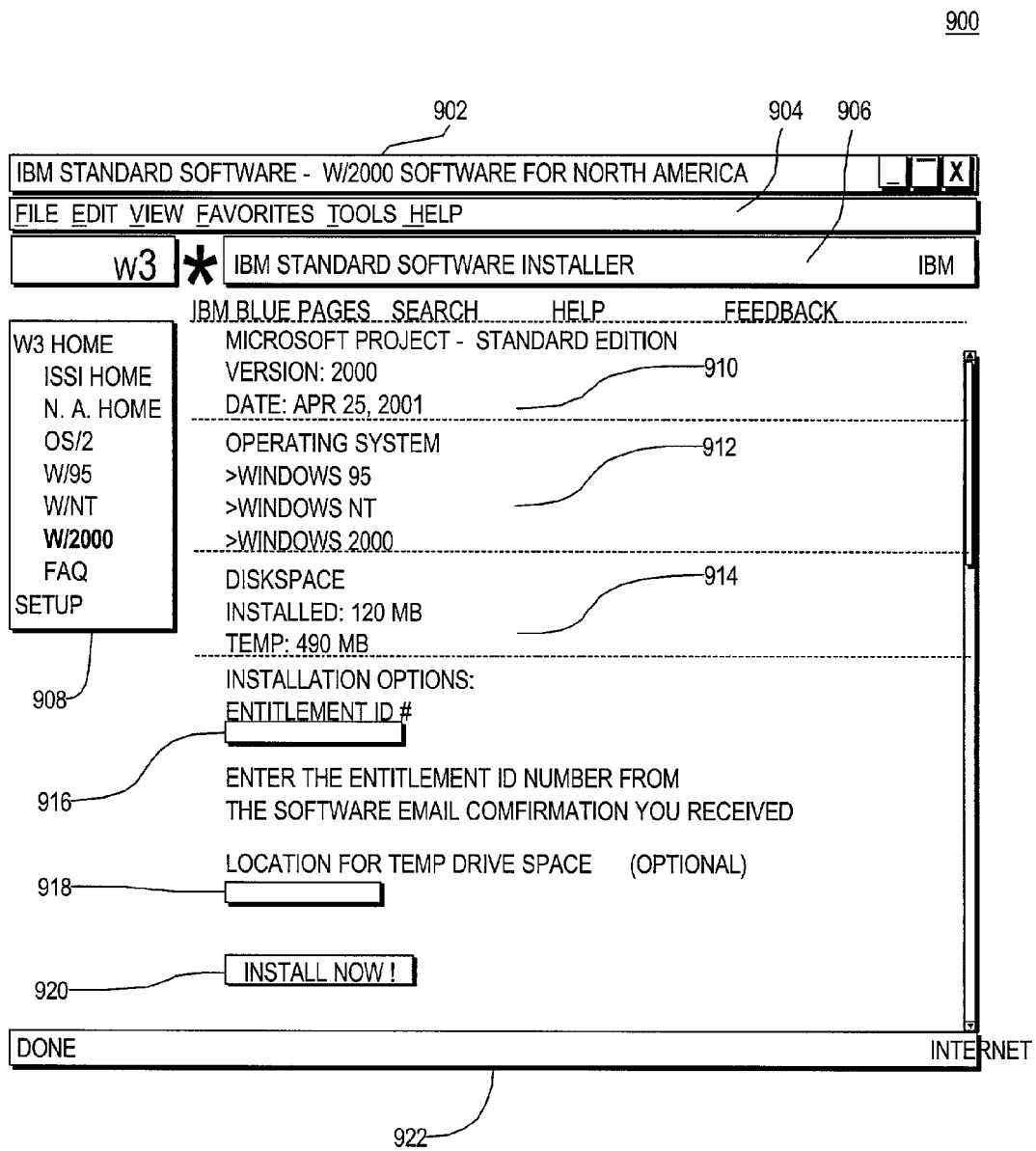
FIG. 9 is a screen shot of a page which receives the entitlement ID which will enable the down load to proceed according to the present invention.

Turning now to FIG. 9, which shows a screen shot 900 of the entitlement ID entry page, according to the present invention. A normal Browser window presents Internet page 902. This Internet page contains the normal Windows controls 904 such as file, edit, view, favorites, tools, and help. The client has selected a URL (Uniform Resource Locator) that presents the W3 IBM standard software installer selection menu 906, and is continuing to select additional sub-menus. The client has selected the W/2000 page from the W3 home page 908. On the previous screen the client was presented with the licensing agreement shown as screen shot 800, which the client has read and agreed to 616. This page presents the client with the details of the selected software 910. The required operating system is listed 912. The disk space required to download and install the selected software is listed 914, which includes the temporary requirement and then the finally amount that is needed.

Next the entitlement ID 916 must be entered. Optionally the location of temporary drive space may be entered 918. Assuming that the entitlement ID has been entered and that it is found in the software delivery application's database 314, the download of the selected software is scheduled by the delivery application server 320, at the staging servers 326 once the "Install Now!" button is selected 922.

Finally the lower task bar 922 indicates that the client is connected to the Internet and that the transfer of the present page is completed.

Screen Shots of the Software Installer

Figure 10:
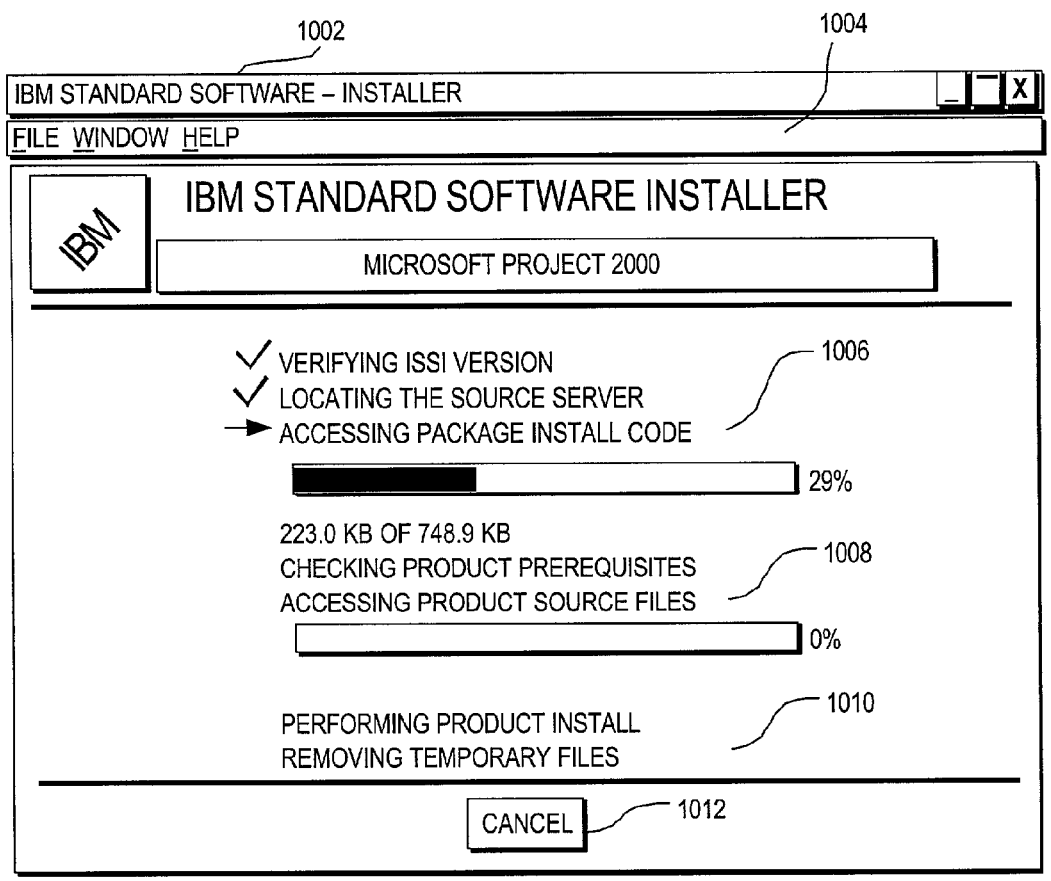
FIG. 10 is a screen shot of the installation progress screen, according to the present invention.

Turning now to FIG. 10, which shows a screen shot 1000 of the installation of the requested software, according to the present invention. Assuming that the entitlement ID has been checked successfully during screen shot 900, the installation commences. The scheduling server 326 established a download session during which the requested software payload 402 with the associated scripts and entitlement ID # will be downloaded. A dialog box 1002 is presented to indicate the steps and the progress of the installation. This Window contains the normal Windows controls 1004 such as file, windows and help. In this view the staging servers have started the installation 1006 once the install code has been assembled into the payload, and as show, this operation is 29% compete. Once this is complete several checks are performed by software delivery application: verify the PC Platform 506, the storage space 508, the Operating System 510 and the prerequisite software 512. 1008. Once the product is downloaded and installed the temporary files are removed 1010. It is noted that no configuration questions are asked or options are provided. Once started the present invention completes the download and installation in an efficient and unattended way, which obviates incorrect or even different choices by the client. Any future help desk support can be accomplished with a known level of consistency. Finally during the installation the client may cancel the installation operation using the cancel button 1012.

Non-Limiting Examples

Although a specific embodiment of the invention has been disclosed. It will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

The invention claimed is:

1. A method on a client server network for the ordering, downloading, and installation of software, the method at the client system comprising:

presenting to a user a list of software for installation on a client system;

receiving a user selection for an order of at least one software file from the list of software on a software ordering server;

receiving a response to the order for at least one software file from the software ordering server, the response includes an entitlement ID for authorizing the installation of the software file, wherein the entitlement ID is sent from the software ordering server to the client system and the software delivery server;

requesting a download copy of the at least one software file from the software delivery server, the request includes the entitlement ID previously received from the software ordering server;

receiving, in response to the entitlement ID received from the software ordering server matching the entitlement ID received with a request for the download copy, the copy of the at least one software file from a staging server as part of a payload containing at least one customized installation script; and installing the received copy of the at least one software file.

2. The method according to claim 1, wherein the receiving a response to the request for a copy of at least one software file, further comprising:

receiving a request for acceptance of a software license agreement for the copy of the at least one software file from the software delivery server; and sending the acceptance of the software license agreement to the software delivery server for the copy of the at least one software file which has been requested.

3. The method according to claim 1, wherein the receiving a response to the request for a copy of the at least one software file, further comprising:

sending a system platform type for the client system;

sending an amount of available storage for the client system; and sending at least one identifier of other software installed on the client system.

4. The method according to claim 1, wherein the order of at least one software file from the software ordering server is accomplished only when the software file is needed for use.

5. The method according to claim 1, wherein the installing the received copy of the at least one software file requires no further intervention from the software ordering server.

6. The method according to claim 1, wherein the installing the received copy of the at least one software file requires no client user intervention by a user on the client system.

7. The method according to claim 1, wherein the installing the at least one received copy of the software file does not allow any choices or options by a user on the client system.

8. The method according to claim 1, wherein completing the installation of the at least one received software file obviates a need for help to install, or questions about the installation of the at least one software file from a help desk.

9. A method on a client server network for the selection, download and installation of software, the method at the software delivery server comprising:

receiving from a software ordering server, an entitlement ID for authorizing the installation of at least one software file which has been previously ordered on a client system, wherein the software ordering server originates the entitlement ID;

receiving a request from the client system for the download of a copy of the at least one software file to the client system, wherein the request includes a downloaded entitlement ID generated by the software ordering server and sent to the client system in response to the client system ordering the copy of the at least one software file from the software ordering server, the downloaded entitlement ID used to order the software file;

verifying both the client system's PC compatibility for the copy of at least one software file which has been requested and that the entitlement ID received from the ordering server matches the entitlement ID used to order the at least one software file; and scheduling the download of the requested software from a staging server to the client system.

10. The method according to claim 9, wherein the verifying, further comprising:

requesting a PC platform type of the client system;

requesting a PC platform's available storage of the client system;

requesting a platform's installed software of the client system; and verifying that one or more responses to the requests above are within allowable limits.

11. A method on a client server network for the ordering, deployment and installation of software, the method at the software delivery server comprising:

receiving an order entitlement ID for at least one software file, which has been previously ordered from a client system on a software ordering server, wherein the software ordering system originates the entitlement ID;

storing the entitlement ID for at least one software file in a database;

receiving from a client system a request for a download of at least one requested software file with a download entitlement ID generated by the software ordering server and sent to the client system in response to the client system ordering a copy of the at least one software file from the software ordering server;

determining if the download entitlement ID matches the order entitlement ID previously stored in the database, and in response to the order entitlement ID matching the download entitlement ID, scheduling a response to the request for a copy of the at least one software file at a scheduling server.

12. A computer readable medium containing programming instructions for the ordering, downloading, and installation of software over a client server network, the programming instructions executing at the client system comprising:

presenting to a user a list of software for installation on a client system;

receiving a user selection for an order of at least one software file from the list of software on a software ordering server;

receiving a response to the order for at least one software file from the software ordering server, the response includes an entitlement ID for authorizing the installation of the software file, wherein the entitlement ID is sent from the software ordering server to the client system and the software delivery server;

requesting a download copy of the at least one software file from the software delivery server, the request includes the entitlement ID previously received from the software ordering server;

receiving, in response to the entitlement ID received from the software ordering server matching the entitlement ID received with a request for the download copy, the copy of the at least one software file from a staging server as part of a payload containing at least one customized installation script; and installing the copy of the at least one software file which has been received.

13. The computer readable medium according to claim 12, wherein the programming instruction of receiving a response to the request for a copy of at least one software file, further comprising the programming instructions of:

receiving a request for acceptance of a software license agreement for the copy of the at least one software file from the software delivery server; and sending the acceptance of the software license agreement to the software delivery server for the copy of the at least one software file which has been requested.

14. The computer readable medium according to claim 12, wherein the programming instruction of receiving a response to the request for a copy of the at least one software file, further comprises:

sending a system platform type for the client system;

sending an amount of available storage for the client system; and sending at least one identifier of other software installed on the client system.

15. A computer readable medium containing programming instructions for the ordering, deployment and installation of software over a client server network, the programming instructions executing at the software delivery server comprising:

receiving an entitlement ID for at least one software file, which has been previously ordered from a client system on a software ordering server, wherein, the software ordering server originates the entitlement ID;

storing the entitlement ID for at least one software file in a database;

receiving from a client system a request for a download of at least one requested software file with a download entitlement ID generated by the software ordering server and sent to the client system in response to the client system ordering a copy of the at least one software file from the software ordering server; and determining if the download entitlement ID matches the order entitlement ID previously stored in the database, and in response to the order entitlement ID matching the download entitlement ID, scheduling a response to the request for a copy of the at least one software file at a scheduling server.

16. A software delivery server coupled to a client server network, the delivery server comprising:

a network interface for coupling at least one client system;

an order entitlement ID received over the network interface for at least one software file, which has been previously ordered by the at least one client system on a software ordering server, wherein the software ordering server originates the entitlement ID;

a database used to store the entitlement ID for at least one software file;

a download request received over the network interface from at least one of the one or more client systems for a copy of the at least one software file, wherein the request includes an order entitlement ID generated by the software ordering server and sent to the one or more client system in response to the one or more client system ordering the copy of the at least one software file from the software ordering server for at least one software file; and means for determining if the entitlement ID received from the client system matches the order entitlement ID previously stored in the database, and in response to the order entitlement ID received from the client system matching the entitlement ID which has been previously stored, scheduling a response to the request for a copy of the at least one software file at a scheduling server.

* * * * *